(12) United States Patent
Shimizu et al.

(10) Patent No.: US 6,853,784 B2
(45) Date of Patent: Feb. 8, 2005

(54) OPTICAL FIBER

(75) Inventors: Makoto Shimizu, Yokohama (JP); Yuji Kubo, Yokohama (JP); Kazuya Kuwahara, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 335 days.

(21) Appl. No.: 09/983,297

(22) Filed: Oct. 23, 2001

(65) Prior Publication Data

US 2002/0051612 A1 May 2, 2002

(30) Foreign Application Priority Data

Oct. 31, 2000 (JP) ...................................... P2000-333690
Aug. 13, 2001 (JP) ...................................... P2001-245638

(51) Int. Cl.$^7$ .............................. G02B 6/00; H04J 14/02
(52) U.S. Cl. ..................... 385/123; 385/124; 385/127; 398/81; 398/147
(58) Field of Search ................................. 385/123, 124, 385/126, 127; 398/81, 147

(56) References Cited

U.S. PATENT DOCUMENTS

| | | | |
|---|---|---|---|
| 3,933,454 A | 1/1976 | DeLuca | 65/3.12 |
| 4,846,867 A | 7/1989 | Yokota et al. | 65/3.12 |
| 5,327,516 A | 7/1994 | Chraplyvy et al. | 385/123 |
| 5,361,319 A * | 11/1994 | Antos et al. | 385/123 |
| 5,740,297 A | 4/1998 | Onishi et al. | 385/127 |
| 5,835,655 A | 11/1998 | Liu et al. | 385/124 |
| 5,878,182 A | 3/1999 | Pekham | 385/123 |
| 6,011,892 A | 1/2000 | Chraplyvy et al. | 385/123 |
| 6,301,419 B1 * | 10/2001 | Tsukitani et al. | 385/123 |
| 6,400,877 B1 * | 6/2002 | Kato et al. | 385/123 |
| 6,449,415 B1 * | 9/2002 | Sasaoka | 385/123 |
| 6,477,306 B2 * | 11/2002 | Kato et al. | 385/123 |
| 6,501,892 B1 * | 12/2002 | Okuno et al. | 385/127 |
| 6,522,821 B1 * | 2/2003 | Hirano et al. | 385/127 |

FOREIGN PATENT DOCUMENTS

| | | | |
|---|---|---|---|
| EP | 0 089 655 A | 9/1983 | 385/123 |
| EP | 0 762 159 A | 3/1997 | 385/123 |
| EP | 0 779 524 A | 6/1997 | 385/123 |
| EP | 0 887 670 A2 | 12/1998 | 385/123 |
| EP | 1 030 198 A | 8/2000 | 385/123 |
| WO | WO 00/64825 | 11/2000 | 385/123 |

OTHER PUBLICATIONS

"Single–Mode Optical Fiber, Opening the Fifth Operating Wavelength Window, " Lucent Technologies, Bell Labs Innovations, AllWave™.

(List continued on next page.)

Primary Examiner—Brian M. Healy
(74) Attorney, Agent, or Firm—McDermott, Will & Emery (57) ABSTRACT

The present invention relates to an optical fiber comprising a structure enabling WDM transmissions by utilizing the whole wavelength range of 1300 nm to 1625 nm as a signal wavelength band. In the optical fiber according to the present invention, the transmission loss is 0.4 dB/km or less at a wavelength of 1310 nm, 0.4 dB/km or less at a wavelength of 1383 nm, and 0.3 dB/km or less at a wavelength of 1550 nm. The chromatic dispersion is 0.1 ps/nm/km or more but 5.5 ps/nm/km or less at a wavelength of 1383 nm, and 0.1 ps/nm/km or more but 16.5 ps/nm/km or less in the wavelength range of 1530 nm to 1565 nm. The cut off wavelength at a length of 22 m is 1300 nm or less, and the absolute value of dispersion slope in the wavelength range of 1300 nm to 1625 nm is 0.1 ps/nm$^2$/km or less.

18 Claims, 4 Drawing Sheets

OTHER PUBLICATIONS

"*Optical Fiber Communication Conference (OFC®) and the International Conference on Integrated Optics and Optical Fiber Communication (IOOC)*," Technical Digest Series, OFC/IOOC Postdeadline Papers, Feb. 25, 1999, pp. i, iv, PD22–1–PD22–3.

"The Design and Fabrication of Monomode Optical Fiber", B.J. Ainslie et al., IEEE Journal of Quantum Electronics, IEEE Inc., New York, U.S., vol. 18, No. 4, Apr. 1, 1982, pp. 514–523, XP000619270.

"Ultimately Low OH Content V.A.D. Optical Fibres", T. Moriyama et al., Electronics Letters, IEE Stevenage, G.B., vol. 16, No. 18, Aug. 28, 1980, pp. 698–699, XP002081489, ISSN: 0013–5194.

"New Hydrogen Aging Loss Mechanism in the 1400 nm Window", K.H. Chang et al., OFC/IOOC '99 Optical Fiber Communication Conference, International Conference on Integrated Optics and Optical Fiber Communication, San Diego, CA, Feb. 21–26, 1999, pp. PD22–1–PD22–3, XP000966791, ISBN 0–7803–5430–3.

"Monomode Optical Fibres with Graded–Index Cores for Low Dispersion at 1.55 mum", B.J. Ainslie et al., British Telecom Technology Journal, London, GB, vol. 2, No. 2, Apr. 1984, pp. 25–34, XP000578795.

"Hydrogen Problems and Longterm Reliability of Fiber Cables" H. Murata et al., Proceedings of the SPIE, SPIE, Bellingham, VA, U.S., vol. 584, 1986, pp. 53–60, XP000884252.

* cited by examiner

| | FIBER A | FIBER B | FIBER C | FIBER D | FIBER E | FIBER F | FIBER G | FIBER H |
|---|---|---|---|---|---|---|---|---|
| TRANSMISSION LOSS BEFORE AGING (dB/km) | | | | | | | | |
| WAVELENGTH 1310nm | 0.32 | 0.33 | 0.33 | 0.33 | 0.33 | 0.33 | 0.33 | 0.33 |
| WAVELENGTH 1383nm | 0.27 | 0.28 | 0.31 | 0.28 | 0.26 | 0.27 | 0.31 | 0.28 |
| WAVELENGTH 1550nm | 0.20 | 0.19 | 0.19 | 0.19 | 0.20 | 0.19 | 0.19 | 0.20 |
| CHROMATIC DISPERSION (ps/nm/km) | | | | | | | | |
| WAVELENGTH 1383nm | 1.3 | 5.0 | 2.3 | 4.3 | 1.3 | 5.0 | 3.9 | 5.4 |
| WAVELENGTH 1550nm | 11.9 | 15.8 | 12.1 | 14.4 | 11.9 | 15.8 | 13.8 | 16.2 |
| CUTOFF WAVELENGTH AT 22 m LENGTH (nm) | 1227 | 1267 | 1291 | 1179 | 1227 | 1190 | 1232 | 1218 |
| DISPERSION SLOPE (dB/km) | | | | | | | | |
| WAVELENGTH 1550nm | 0.063 | 0.064 | 0.058 | 0.060 | 0.063 | 0.064 | 0.059 | 0.064 |
| TRANSMISSION LOSS AT 1383 nm WAVELENGTH (dB/km) | | | | | | | | |
| BEFORE AGING | 0.27 | 0.28 | 0.31 | 0.28 | 0.26 | 0.27 | 0.31 | 0.28 |
| AFTER AGING | 0.31 | 0.34 | 0.32 | 0.37 | 0.31 | 0.33 | 0.31 | 0.35 |
| INCREASE UPON AGING | 0.04 | 0.06 | 0.01 | 0.09 | 0.05 | 0.06 | 0.00 | 0.07 |

OPTICAL FIBER

BACKGROUND OF THE INVENTION

1. Field of the Invention

The present invention relates to an optical fiber suitable as a transmission line of a wavelength division multiplexing (WDM) transmission system for transmitting multiplexed signals of a plurality of channels having wavelengths different from each other.

2. Related Background Art

A wavelength division multiplexing (WDM) transmission system is a system for transmitting multiplexed signals (WDM signals) of a plurality of channels included in a predetermined signal wavelength band, and makes it possible to transmit and receive a large capacity of information. Conventionally, signal wavelength bands in which WDM transmissions are carried out have been in the wavelength range of 1530 nm to 1565 nm, and optical fibers employed in a transmission line have been designed so as to have an optimal characteristic in this wavelength range (e.g., U.S. Pat. No. 5,327,516). Recently, the wavelength range of 1565 nm to 1625 nm, which is on the longer wavelength side than the above-mentioned wavelength range, and the wavelength range of 1440 nm to 1530 nm, which is on the shorter wavelength side than the above-mentioned wavelength range, have been under consideration as a signal wavelength band in which WDM transmissions are to be carried out, whereby optical fibers having favorable characteristics in these wavelength ranges have been proposed as well.

SUMMARY OF THE INVENTION

The inventors studied conventional techniques such as those mentioned above and, as a result, have found problems as follows. Namely, the conventional optical fibers developed or proposed heretofore have a chromatic dispersion not suitable for WDM transmission in wavelength ranges having a wavelength of 1440 nm or shorter. The conventional optical fibers have a zero-dispersion wavelength at a wavelength of 1450 nm or longer, and their chromatic dispersion in the wavelength range of 1300 nm to 1625 nm does not have a fixed polarity, thereby failing to realize WDM transmissions using the whole wavelength range as a signal wavelength band. Also, while having a chromatic dispersion of several ps/nm/km enabling WDM transmissions at a certain wavelength, the conventional optical fibers have a chromatic dispersion of several tens of ps/nm/km unsuitable for WDM transmissions at other wavelengths, thus making it difficult to realize WDM transmissions using the whole wavelength range of 1300 nm to 1625 nm as a signal wavelength band. Further, since the transmission loss at a wavelength of 1383 nm increases when hydrogen existing in the environment of use and hydrogen occurring from materials constituting optical cables combines with glass defects, it has been hard for the conventional optical fibers to realize WDM transmissions using wavelength ranges with a wavelength of 1440 nm or shorter as a signal wavelength band.

In order to overcome the problems mentioned above, it is an object of the present invention to provide an optical fiber suitable as a transmission line for WDM transmissions using the whole wavelength range of 1300 nm to 1625 nm as a signal light wavelength band.

The optical fiber according to the present invention has a cutoff wavelength of 1300 nm or less at a length of 22 m, a transmission loss of 0.4 dB/km or less at a wavelength of 1383 nm, a chromatic dispersion of 0.1 ps/nm/km or more but 5.5 ps/nm/km or less at a wavelength of 1383 nm, and a dispersion slope having an absolute value of 0.1 $ps/nm^2/km$ or less in the wavelength range of 1300 nm to 1625 nm.

In such an optical fiber, the transmission loss at a wavelength of 1383 nm is so low that it does not obstruct WDM transmissions, whereas the cutoff wavelength, chromatic dispersion, and dispersion slope are suitable for realizing WDM transmissions in wavelength ranges having a wavelength of 1440 nm or shorter. Therefore, this optical fiber is suitable as a transmission line realizing WDM transmissions using the whole wavelength range of 1300 nm to 1625 nm as a signal wavelength band.

Preferably, in the optical fiber according to the present invention, the transmission loss at a wavelength of 1550 nm is 0.3 dB/km or less, and the chromatic dispersion in the wavelength range of 1530 nm to 1565 nm is 0.1 ps/nm/km or more but 16.5 ps/nm/km or less. In this case, the optical fiber secures a transmission quality on a par with or better than that of conventional WDM optical fibers in the wavelength band of 1530 nm to 1565 nm, which is mainly used for WDM transmissions.

Preferably, in the optical fiber according to the present invention, the transmission loss at a wavelength of 1383 nm after completing a hydrogen aging process in which hydrogen is let out for 14 days or more after aging for 4 days in an atmosphere with a hydrogen pressure of 1 atm at room temperature (25° C.) is 0.4 dB/km or less, or does not exceed the transmission loss at a wavelength of 1310 nm exhibited before the hydrogen aging process. Preferably, in the optical fiber according to the present invention, the transmission loss at a wavelength of 1383 nm after completing a hydrogen aging process in which hydrogen is let out for 14 days or more after aging for 10 days in the atmosphere with a hydrogen pressure of 0.01 atm at room temperature (25° C.) is 0.4 dB/km or less, or does not exceed the transmission loss at a wavelength of 1300 nm exhibited before the hydrogen aging process. In these cases, the optical fiber is less likely to be influenced by hydrogen existing in the environment of use or hydrogen generated from materials constituting optical cables, so that the transmission loss at a wavelength of 1383 nm increases only slightly (0.4 dB/km or less), whereby the optical fiber is also suitable for WDM transmissions using wavelength ranges with a wavelength of 1440 nm or shorter as a signal wavelength band.

The optical fiber according to the present invention comprises a first core extending along a predetermined axis and having a first refractive index; a second core, provided on the outer periphery of the first core, having a second refractive index lower than the first refractive index; and a cladding region, provided on the outer periphery of the second core, having a third refractive index lower than the second refractive index.

The cladding region includes an optical cladding and a physical cladding. The ratio (c/a) of the outer diameter $2c$ of the optical cladding to the outer diameter $2a$ of the first core is 4.8 or more. In this case, the optical cladding whose OH radical content is smaller than that in the physical cladding acting as a jacket layer is made thicker, whereby the transmission loss of the optical fiber at a wavelength of 1383 nm is effectively reduced. In this specification, the optical cladding refers to the inner area of cladding region functioning as a waveguide through which light propagates, whereas the physical cladding refers to the outer area of cladding region, which is also referred to as the jacket layer and positioned on the outside of the optical cladding, imparting a physical strength to the optical fiber. The method of calculating the outer diameter of the optical cladding is disclosed in U.S. Pat. No. 5,740,297.

Preferably, in the step of making an optical fiber preform for yielding the optical fiber according to the present invention, a core rod including an area to become the first core, second core, and optical cladding in the optical fiber preform is dehydrated at a high temperature of 1250° C. or more. The high-temperature dehydrating process eliminates OH radical from the core rod, whereby the transmission loss of the optical fiber at a wavelength of 1383 nm is reduced. Preferably, the core rod has an outer peripheral part ground by a thickness of 5% or more with respect to the outer diameter thereof. When the outer peripheral part of core rod having a relatively large residual amount of OH radical is ground as such, the transmission loss of the optical fiber at a wavelength of 1383 nm is reduced.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 3A is a view showing a cross-sectional structure of an optical fiber according to the present invention, whereas

DESCRIPTION OF THE PREFERRED EMBODIMENTS

In the following, embodiments of the optical fiber according to the present invention will be explained with reference to FIGS. 1, 2, 3A, 3B, and 4. In the explanation of the drawings, constituents identical to each other will be referred to with numerals or letters identical to each other without repeating their overlapping descriptions.

By setting the cutoff wavelength, transmission loss, chromatic dispersion, and dispersion slope into their respective optimal numerical ranges, the optical fiber according to the present invention has a structure suitable as a transmission line for WDM transmissions using the whole wavelength range of 1300 nm to 1625 nm as a signal wavelength band.

Figure 1:
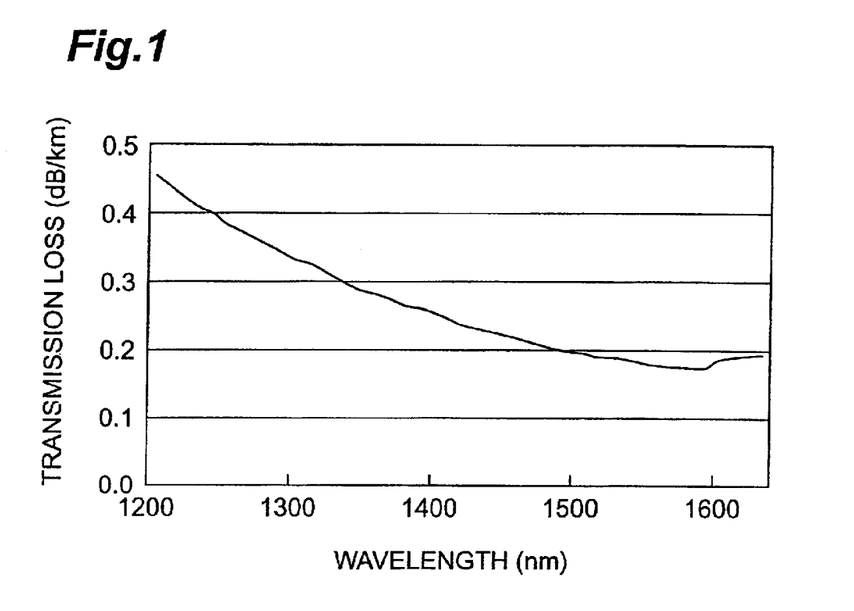
FIG. 1 is a graph showing the wavelength dependence of transmission loss in an optical fiber according to the present invention.

FIG. 1 is a graph showing the wavelength dependence of transmission loss in the optical fiber according to the present invention. As can be seen from the graph of FIG. 1, the transmission loss of the optical fiber according to the present invention is 0.4 dB/km or less at a wavelength of 1383 nm.

Preferably, the transmission loss of the optical fiber is 0.3 dB/km or less at a wavelength of 1550 nm, and 0.4 dB/km or less at a wavelength of 1310 nm.

Figure 2:
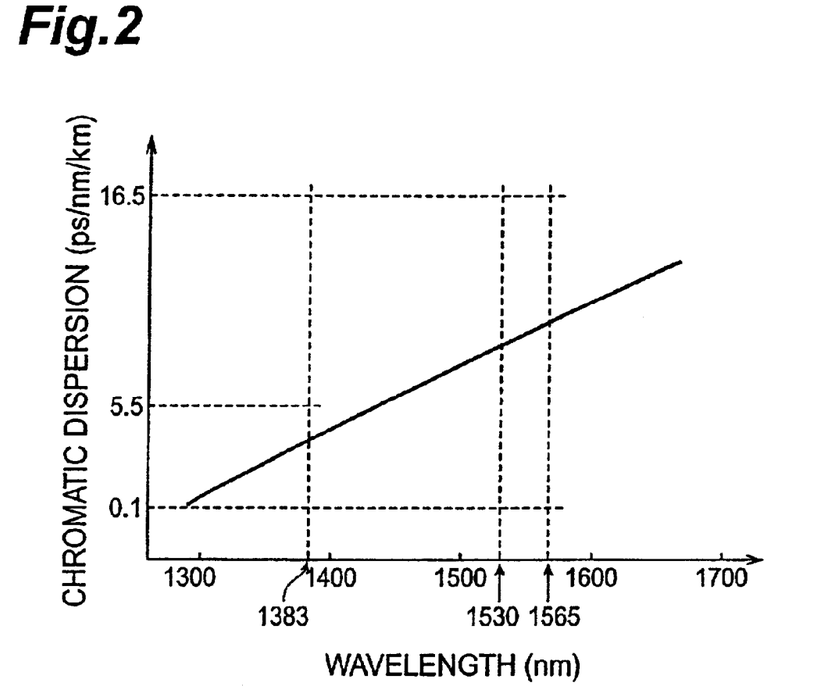
FIG. 2 is a graph showing the wavelength dependence of chromatic dispersion in the optical fiber according to the present invention.

FIG. 2 is a graph showing the wavelength dependence of chromatic dispersion in the optical fiber according to the present invention. As can be seen from the graph of FIG. 2, the chromatic dispersion of the optical fiber according to the present invention is 0.1 ps/nm/km or more but 5.5 ps/nm/km or less at a wavelength of 1383 nm. Preferably, the chromatic dispersion of the optical fiber is 0.1 ps/nm/km or more but 16.5 ps/nm/km or less in the wavelength range of 1530 nm to 1565 nm.

Further, the optical fiber according to the present invention has a cutoff wavelength of 1300 nm or less at a length of 22 m and a dispersion slope with an absolute value of 0.1 ps/nm²/km or less in the wavelength range of 1300 nm to 1625 nm. Preferably, the bending loss of the optical fiber at a wavelength of 1550 nm is 0.05 dB or less when wound by 100 turns about a mandrel having a diameter of 75 mm, and 0.5 dB or less when wound by 1 turn about a mandrel having a diameter of 30 mm.

Figure 3A:
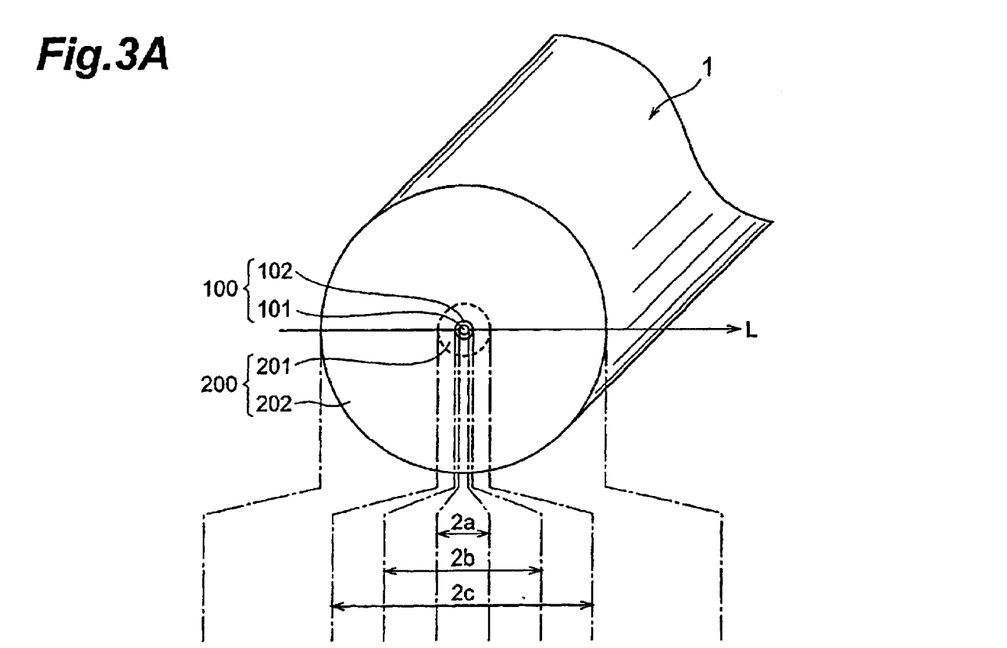

FIG. 3A is a view showing a cross-sectional structure of the optical fiber according to the present invention. The optical fiber 1 according to the present invention comprises a core region 100 and a cladding region 200 surrounding the core region 100. The core region 100 comprises a first core 101 extending along a predetermined axis and having a first refractive index $n_1$ and an outer diameter $2a$; and a second core 102 surrounding the first core 101 and having a second refractive index $n_2$ lower than the first refractive index $n_1$ and an outer diameter $2b$. On the other hand, the cladding region 200 has an optical cladding 201 surrounding the second core 102 and a physical cladding 202 surrounding the optical cladding. Here, each of the optical cladding 201 and physical cladding 202 has a third refractive index $n_3$ which is lower than the second refractive index $n_2$, whereas the optical cladding 201 has an outer diameter $2c$. It is not always necessary for the refractive index of the optical cladding 201 and that of the physical cladding 202 to coincide with each other.

In this specification, the optical cladding refers to the inner area of cladding region functioning as a waveguide through which light propagates; whereas the physical cladding refers to the outer area of cladding, which is also known as a jacket layer and positioned on the outside of the optical cladding, imparting a physical strength to the optical fiber. The method of calculating the outer diameter of the optical cladding is disclosed in U.S. Pat. No. 5,740,297.

Figure 3B:
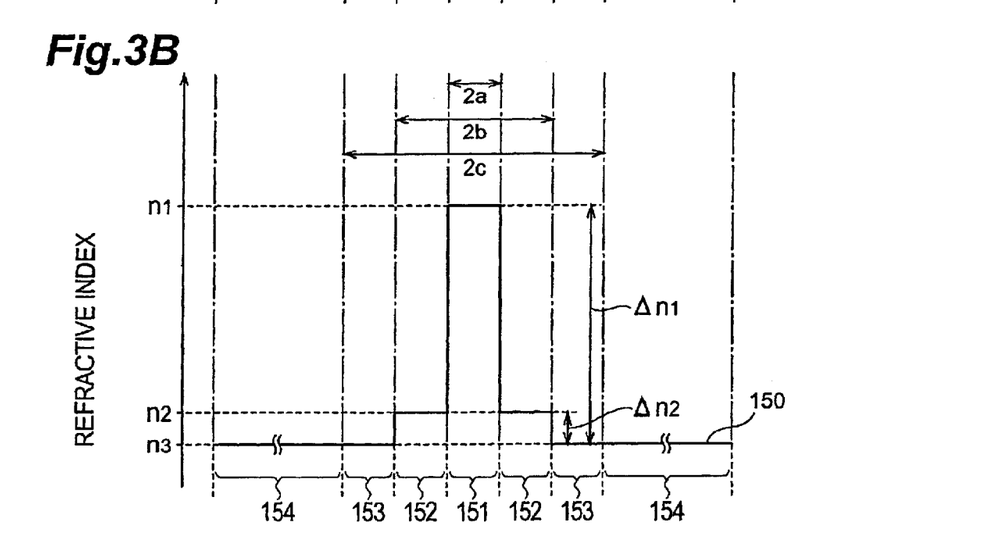
FIG. 3B is a refractive index profile of the optical fiber shown in FIG. 3A.

FIG. 3B shows a refractive index profile 150 showing the refractive index in each part on a line L in FIG. 3A. Areas 151, 152, 153, and 154 in the refractive index profile 150 indicate the refractive indices of individual parts on the line L of the first core 101, second core 102, optical cladding 201, and physical cladding 202, respectively.

The optical fiber 1 having such a refractive index profile 150 is obtained when, while using silica glass as a base, the first core 101 and second core 102 are doped with their respective appropriate amounts of $GeO_2$, or when the first core 101 and the cladding region 200 are doped with $GeO_2$ and F element, respectively. In the step of making an optical fiber preform for yielding the optical fiber 1, a core rod including areas to become the first core 101, second core 102, and optical cladding 201 in the optical fiber preform is obtained by way of the preparation of a porous glass rod including these areas and the transparentization by sintering.

In the state where the core rod is inserted in a pipe of silica glass acting as an area (part of the optical fiber preform) to become the physical cladding, the glass pipe and core rod are collapsed, whereby the optical fiber preform is obtained.

In FIG. 3B, $\Delta n_1$ is the relative refractive index difference of the first core 101 with reference to the refractive index $\Delta n_3$ of the cladding region 200, and is given by the following expression (1):

$$\Delta n_1 = (n_1 - n_3)/n_1 \quad (1)$$

On the other hand, $\Delta n_2$ is the relative refractive index difference of the second core 102 with reference to the refractive index $n_3$ of the cladding region 200, and is given by the following expression (2):

$$\Delta n_2 = (n_2 - n_3)/n_2 \quad (2)$$

While the above-mentioned $\Delta n_1$ and $\Delta n_2$ are each given with reference to the refractive index of the cladding region 200, they will be given with reference to the refractive index of the physical cladding 202 if the refractive index of the optical cladding 201 and that of the physical cladding 202 do not coincide with each other. When simply mentioned in this specification, "cladding region" refers to the whole area including both of the optical cladding 201 and physical cladding 202.

In the optical fiber 1 having such a refractive index profile 150, it is preferred that the ratio (c/a) of the outer diameter 2c of the optical cladding 201 to the outer diameter 2a of the first core 101 be 4.8 or more. In this case, the optical cladding 201 whose OH radical content is smaller than that in the physical cladding 202 provided on the outermost layer of the optical fiber 1 as a jacket layer can be made thicker, whereby the transmission loss of the optical fiber 1 at a wavelength of 1383 nm can be reduced. In the step of making the optical fiber preform for yielding the optical fiber 1, it is preferred that the core rod including areas to become the first core 101, second core 102, and optical cladding 201 be dehydrated at a high temperature of 1250° C. or more. In this case, OH radical is eliminated by the high-temperature dehydrating processing, whereby the transmission loss of the optical fiber 1 at a wavelength of 1383 nm is lowered. Also, in the step of making the optical fiber preform, it is preferred that the outer peripheral part of core rod including the areas to become the first core 101, second core 102, and optical cladding 201 be ground by a thickness of 5% or more of the outer diameter of the core rod. When the outer peripheral part of the core rod having a relatively large residual amount of OH radical is eliminated by grinding as such, the transmission loss of the optical fiber 1 at a wavelength of 1383 nm is reduced more effectively.

For reducing the transmission loss of the optical fiber 1 at a wavelength of 1383 nm, it is preferred to carry out at least two processes of setting the ratio (c/a) of the outer diameter 2c of the optical cladding 201 to the outer diameter 2a of the first core 101 to 4.8 or more, dehydrating the core rod at a high temperature of 1250° C. or more in the step of making the optical fiber preform, and grinding the outer peripheral part of the core rod by a thickness of 5% or more of the diameter of the core rod.

In the optical fiber 1 according to the present invention comprising the foregoing structure, the mode field diameter at a wavelength of 1550 nm is 8.7 $\mu$m or more, each of the amounts of concentricity error of the first core 101 and second core 102 with respect to the cladding region 200, i.e., the core concentricity error, is 0.5 $\mu$m or less, the outer diameter of the cladding region 200, i.e., the cladding diameter, is 124.0 $\mu$m to 126.0 $\mu$m, the non-circularity of the outer diameter of the cladding region 200, i.e., the cladding non-circularity, is 1% or less, the outer diameter of the resin layer covering the optical fiber 1, i.e., the coating diameter, is 235 $\mu$m to 265 $\mu$m, and the proof level is 0.86 GPa (1.2%). In this specification, the above-mentioned core concentricity error and cladding non-circularity are numerical values obtained according to the calculating methods defined in Japanese Industrial Standard (JIS) C6822.

Samples prepared as examples of the optical fiber according to the present invention will now be explained. Each of the optical fibers of first and second samples explained in the following has the cross-sectional structure and refractive index profile shown in FIGS. 3A and 3B.

In the optical fiber of the first sample, the outer diameter 2a of the first core is 6.3 $\mu$m, the outer diameter 2b of the second core is 37.7 $\mu$m, the outer diameter 2c of the optical cladding is 42.0 $\mu$m (c/a=about 6.7), the outer diameter of the whole cladding region (corresponding to the outer diameter of the physical cladding and the fiber outer diameter) is 125.2 $\mu$m, and the outer diameter of the resin coating layer is 254 $\mu$m. The relative refractive index differences $\Delta n_1$ and $\Delta n_2$ of the first and second cores with reference to the cladding region are 0.49% and 0.079%, respectively.

In the optical fiber of the first sample having such a structure, the transmission loss was 0.32 dB/km at a wavelength of 1310 nm, 0.27 dB/km at a wavelength of 1383 nm, and 0.20 dB/km at a wavelength of 1550 nm. Its chromatic dispersion was 1.3 ps/nm/km at a wavelength of 1383 nm, and 11.9 ps/nm/km at a wavelength of 1550 nm. Its cutoff wavelength at a length of 22 m was 1227 nm or less. Its absolute value of dispersion slope at a wavelength of 1550 nm was 0.063 ps/nm$^2$/km or less. Its bending loss at a wavelength of 1550 nm was 0.05 dB or less when wound by 100 turns about a mandrel having a diameter of 75 mm, and 0.5 dB or less when wound by 1 turn about a mandrel having a diameter of 30 mm. Its mode field diameter at a wavelength of 1550 nm was 9.3 $\mu$m, the core concentricity error was 0.1 $\mu$m or less, and the cladding non-circularity was 0.2% or less. Its proof level was 0.86 GPa (1.2%).

In the optical fiber of the second sample, the outer diameter 2a of the first core is 7.4 $\mu$m, the outer diameter 2b of the second core is 48.1 $\mu$m, the outer diameter 2c of the optical cladding is 49.6 $\mu$m (c/a=about 6.7), the outer diameter of the whole cladding region (corresponding to the outer diameter of the physical cladding and the fiber outer diameter) is 125.1 $\mu$m, and the outer diameter of the resin coating layer is 252 $\mu$m. The relative refractive index differences $\Delta n_1$ and $\Delta n_2$ of the first and second cores with reference to the cladding region are 0.47% and 0.058%, respectively.

In the optical fiber of the second sample having such a structure, the transmission loss was 0.33 dB/km at a wavelength of 1310 nm, 0.28 dB/km at a wavelength of 1383 nm, and 0.19 dB/km at a wavelength of 1550 nm. Its chromatic dispersion was 5.0 ps/nm/km at a wavelength of 1383 nm, and 15.8 ps/nm/km at a wavelength of 1550 nm. Its cutoff wavelength at a length of 22 m was 1267 nm or less. Its absolute value of dispersion slope at a wavelength of 1550 nm was 0.064 ps/nm$^2$/km or less. Its bending loss at a wavelength of 1550 nm was 0.05 dB or less when wound by 100 turns about a mandrel having a diameter of 75 mm, and 0.5 dB or less when wound by 1 turn about a mandrel having a diameter of 30 mm. Its mode field diameter at a wavelength of 1550 nm was 9.4 $\mu$m, the core concentricity error was 0.1 $\mu$m or less, and the cladding non-circularity was 0.2% or less. Its proof level was 0.86 GPa (1.2%).

Figure 4:
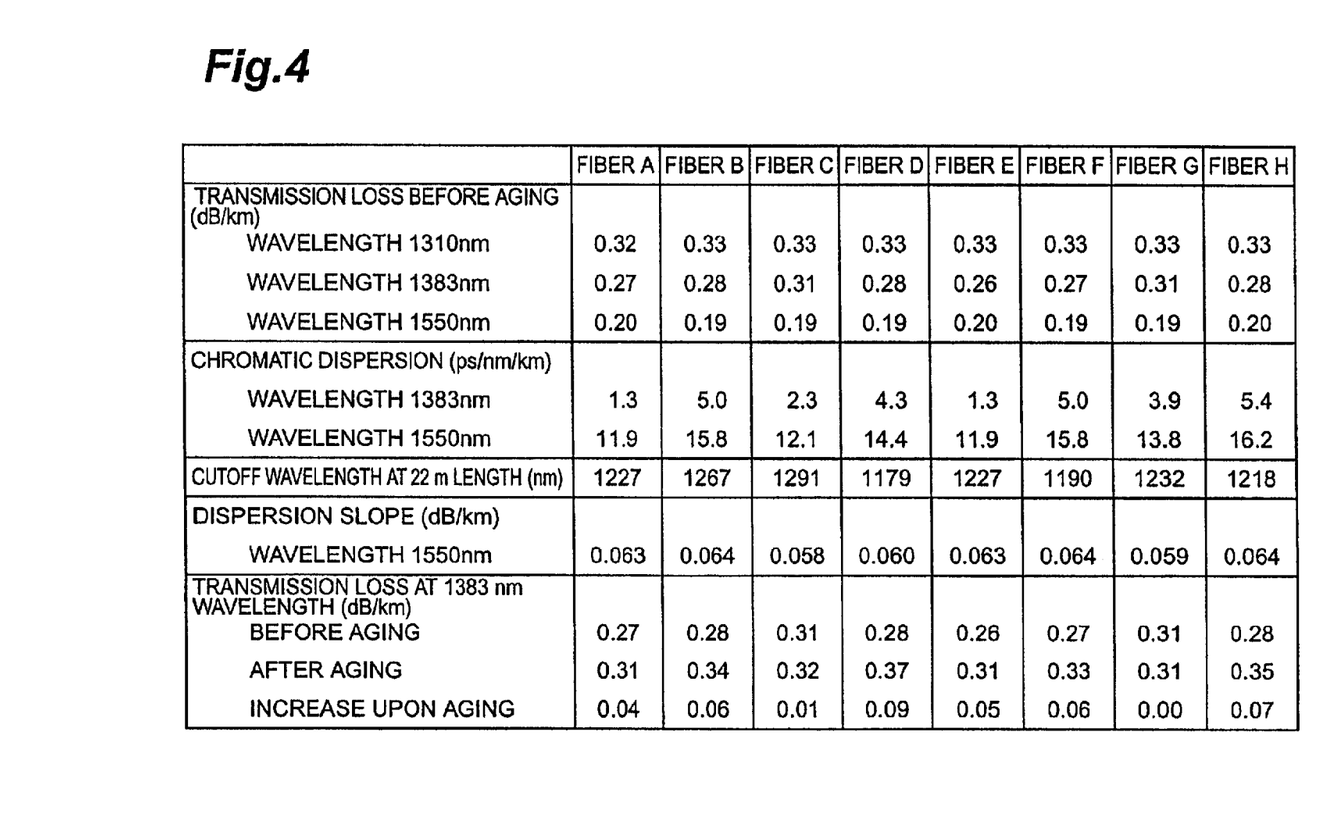
FIG. 4 is a table listing various characteristics of fibers A to H manufactured as examples of the optical fiber according to the present invention.

Further, a plurality of samples (fibers A to H) manufactured as examples of the optical fiber according to the present invention will be explained. Each of the fibers A to H has the cross-sectional structure and refractive index profile shown in FIGS. 3A and 3B. FIG. 4 is a table listing various characteristics of the fibers A to H. The fibers A to D were subjected to a hydrogen aging process in which hydrogen was let out for 14 days or more after aging for 4 days in an atmosphere at room temperature (25° C.) with a hydrogen pressure of 1 atm. On the other hand, the fibers E to H were subjected to a hydrogen aging process in which hydrogen was let out for 14 days or more after aging for 10 days in an atmosphere at room temperature (25° C.) with a hydrogen pressure of 0.01 atm.

In the fiber A, the outer diameter $2a$ of the first core is 6.3 µm, the outer diameter $2b$ of the second core is 37.7 µm, and the outer diameter $2c$ of the optical cladding is 42.0 µm (c/a=about 6.7). The relative refractive index differences $\Delta n_1$ and $\Delta n_2$ of the first and second cores with reference to the cladding region are 0.49% and 0.079%, respectively. In the fiber A having such a structure, the transmission loss before the hydrogen aging process was 0.32 dB/km at a wavelength of 1310 nm, 0.27 dB/km at a wavelength of 1383 nm, and 0.20 dB/km at a wavelength of 1550 nm. Its chromatic dispersion was 1.3 ps/nm/km at a wavelength of 1383 nm, and 11.9 ps/nm/km at a wavelength of 1550 nm. Its cutoff wavelength at a length of 22 m was 1227 nm. The absolute value of its dispersion slope at a wavelength of 1550 nm was 0.063 ps/nm²/km.

In the fiber B, the outer diameter $2a$ of the first core is 7.4 µm, the outer diameter $2b$ of the second core is 48.1 µm, and the outer diameter $2c$ of the optical cladding is 49.6 µm (c/a=about 6.7). The relative refractive index differences $\Delta n_1$ and $\Delta n_2$ of the first and second cores with reference to the cladding region are 0.47% and 0.058%, respectively. In the fiber B having such a structure, the transmission loss before the hydrogen aging process was 0.33 dB/km at a wavelength of 1310 nm, 0.28 dB/km at a wavelength of 1383 nm, and 0.19 dB/km at a wavelength of 1550 nm. Its chromatic dispersion was 5.0 ps/nm/km at a wavelength of 1383 nm, and 15.8 ps/nm/km at a wavelength of 1550 nm. Its cutoff wavelength at a length of 22 m was 1267 nm. The absolute value of its dispersion slope at a wavelength of 1550 nm was 0.064 ps/nm²/km.

In the fiber C, the outer diameter $2a$ of the first core is 7.2 µm, the outer diameter $2b$ of the second core is 39.6 µm, and the outer diameter $2c$ of the optical cladding is 43.7 µm (c/a=about 6.1). The relative refractive index differences $\Delta n$ and $\Delta n_2$ of the first and second cores with reference to the cladding region are 0.51% and 0.078%, respectively. In the fiber C having such a structure, the transmission loss before the hydrogen aging process was 0.33 dB/km at a wavelength of 1310 nm, 0.31 dB/km at a wavelength of 1383 nm, and 0.19 dB/km at a wavelength of 1550 nm. Its chromatic dispersion was 2.3 ps/nm/km at a wavelength of 1383 nm, and 12.1 ps/nm/km at a wavelength of 1550 nm. Its cutoff wavelength at a length of 22 m was 1291 nm. The absolute value of its dispersion slope at a wavelength of 1550 nm was 0.058 ps/nm²/km.

In the fiber D, the outer diameter $2a$ of the first core is 8.2 µm, the outer diameter $2b$ of the second core is 45.1 µm, and the outer diameter $2c$ of the optical cladding is 49.3 µm (c/a=about 6.0). The relative refractive index differences $\Delta n_1$ and $\Delta n_2$ of the first and second cores with reference to the cladding region are 0.46% and 0.059%, respectively. In the fiber D having such a structure, the transmission loss before the hydrogen aging process was 0.33 dB/km at a wavelength of 1310 nm, 0.28 dB/km at a wavelength of 1383 nm, and 0.19 dB/km at a wavelength of 1550 nm. Its chromatic dispersion was 4.3 ps/nm/km at a wavelength of 1383 nm, and 14.4 ps/nm/km at a wavelength of 1550 nm. Its cutoff wavelength at a length of 22 m was 1179 nm. The absolute value of its dispersion slope at a wavelength of 1550 nm was 0.060 ps/nm²/km.

In the fiber E, the outer diameter $2a$ of the first core is 7.4 µm, the outer diameter $2b$ of the second core is 40.7 µm, and the outer diameter $2c$ of the optical cladding is 42.0 µm (c/a=about 5.7). The relative refractive index differences $\Delta n_1$ and $\Delta n_2$ of the first and second cores with reference to the cladding region are 0.49% and 0.079%, respectively. In the fiber E having such a structure, the transmission loss before the hydrogen aging process was 0.33 dB/km at a wavelength of 1310 nm, 0.26 dB/km at a wavelength of 1383 nm, and 0.20 dB/km at a wavelength of 1550 nm. Its chromatic dispersion was 1.3 ps/nm/km at a wavelength of 1383 nm, and 11.9 ps/nm/km at a wavelength of 1550 nm. Its cutoff wavelength at a length of 22 m was 1227 nm. The absolute value of its dispersion slope at a wavelength of 1550 nm was 0.063 ps/nm²/km.

In the fiber F, the outer diameter $2a$ of the first core is 8.7 µm, the outer diameter $2b$ of the second core is 47.9 µm, and the outer diameter $2c$ of the optical cladding is 49.6 µm (c/a=about 4.8). The relative refractive index differences $\Delta n_1$ and $\Delta n_2$ of the first and second cores with reference to the cladding region are 0.47% and 0.058%, respectively. In the fiber E having such a structure, the transmission loss before the hydrogen aging process was 0.33 dB/km at a wavelength of 1310 nm, 0.27 dB/km at a wavelength of 1383 nm, and 0.19 dB/km at a wavelength of 1550 nm. Its chromatic dispersion was 5.0 ps/nm/km at a wavelength of 1383 nm, and 15.8 ps/nm/km at a wavelength of 1550 nm. Its cutoff wavelength at a length of 22 m was 1190 nm. The absolute value of its dispersion slope at a wavelength of 1550 nm was 0.064 ps/nm²/km.

The fiber G is a fiber in which the outer diameter $2b$ of the second core and the outer diameter $2c$ of the optical cladding coincide with each other. In the fiber G, the outer diameter $2a$ of the first core is 6.4 µm, the outer diameter $2b$ of the second core is 42.8 µm, and the outer diameter $2c$ of the optical cladding is 42.8 µm (c/a=about 6.7). The relative refractive index differences $\Delta n_1$ and $\Delta n_2$ of the first and second cores with reference to the cladding region are 0.49% and 0.078%, respectively. In the fiber G having such a structure, the transmission loss before the hydrogen aging process was 0.33 dB/km at a wavelength of 1310 nm, 0.31 dB/km at a wavelength of 1383 nm, and 0.19 dB/km at a wavelength of 1550 nm. Its chromatic dispersion was 3.9 ps/nm/km at a wavelength of 1383 nm, and 13.8 ps/nm/km at a wavelength of 1550 nm. Its cutoff wavelength at a length of 22 m was 1232 nm. The absolute value of its dispersion slope at a wavelength of 1550 nm was 0.059 ps/nm²/km.

Also, the fiber H is a fiber in which the outer diameter $2b$ of the second core and the outer diameter $2c$ of the optical cladding coincide with each other. In the fiber H, the outer diameter $2a$ of the first core is 7.4 µm, the outer diameter $2b$ of the second core is 49.8 µm, and the outer diameter $2c$ of the optical cladding is 49.8 µm (c/a=about 6.7). The relative refractive index differences $\Delta n_1$ and $\Delta n_2$ of the first and second cores with reference to the cladding region are 0.46% and 0.054%, respectively. In the fiber H having such a structure, the transmission loss before the hydrogen aging process was 0.33 dB/km at a wavelength of 1310 nm, 0.28 dB/km at a wavelength of 1383 nm, and 0.20 dB/km at a wavelength of 1550 nm. Its chromatic dispersion was 5.4 ps/nm/km at a wavelength of 1383 nm, and 16.2 ps/nm/km at a wavelength of 1550 nm. Its cutoff wavelength at a length of 22 m was 1218 nm. The absolute value of its dispersion slope at a wavelength of 1550 nm was 0.064 ps/nm²/km.

Results of the hydrogen aging process (for an aging period of 4 days at room temperature with a hydrogen pressure of 1 atm, and a hydrogen discharging period of 14 days or more) carried out for the optical fibers A to D are as follows. In the fiber A, the transmission loss at a wavelength of 1383 nm was 0.27 dB/km before the hydrogen aging process and 0.31 dB/km thereafter, there by increasing by 0.04 dB/km upon the hydrogen aging process. In the fiber B, the transmission loss at a wavelength of 1383 nm was 0.28 dB/km before the hydrogen aging process and 0.34 dB/km thereafter, thereby increasing by 0.06 dB/km upon the hydrogen aging process. In the fiber C, the transmission loss at a wavelength of 1383 nm was 0.31 dB/km before the hydrogen aging process and 0.32 dB/km thereafter, thereby increasing by 0.01 dB/km upon the hydrogen aging process. In the fiber D, the transmission loss at a wavelength of 1383 nm was 0.28 dB/km before the hydrogen aging process and 0.37 dB/km thereafter, thereby increasing by 0.09 dB/km upon the hydrogen aging process.

Results of the hydrogen aging process (for an aging period of 10 days at room temperature with a hydrogen pressure of 0.01 atm, and a hydrogen discharging period of 14 days or more) carried out for the optical fibers E to H are as follows. In the fiber E, the transmission loss at a wavelength of 1383 nm was 0.26 dB/km before the hydrogen aging process and 0.31 dB/km thereafter, thereby increasing by 0.05 dB/km upon the hydrogen aging process. In the fiber F, the transmission loss at a wavelength of 1383 nm was 0.27 dB/km before the hydrogen aging process and 0.33 dB/km thereafter, thereby increasing by 0.06 dB/km upon the hydrogen aging process. In the fiber G, the transmission loss at a wavelength of 1383 nm was 0.31 dB/km before and after the hydrogen aging process, thus yielding no change upon the hydrogen aging process. In the fiber H, the transmission loss at a wavelength of 1383 nm was 0.28 dB/km before the hydrogen aging process and 0.35 dB/km thereafter, thereby increasing by 0.07 dB/km upon the hydrogen aging process.

As can be seen from the foregoing, the transmission loss at a wavelength of 1383 nm after the hydrogen aging process was 0.4 dB/km or less in each of the fibers A to H. In each of the fibers A, C, E, and G, the transmission loss at a wavelength of 1383 nm after the hydrogen aging process did not exceed that exhibited before the hydrogen aging process. Thus, the fibers A to H are suitable as a transmission line for WDM transmissions using wavelength ranges with a wavelength of 1440 nm or shorter as a signal wavelength band, since the transmission loss at a wavelength of 1383 nm increases only slightly (by 0.4 dB/km or less) even when influenced by hydrogen existing in the environment of use or hydrogen occurring from materials constituting optical cables.

As can be seen from the foregoing, the cutoff wavelength at a length of 22 m, the transmission loss at a wavelength of 1383 nm, the chromatic dispersion at a wavelength of 1383 nm, and the absolute value of dispersion slope in the wavelength range of 1300 nm to 1625 nm are set appropriately according to the present invention. As a consequence, the transmission loss at a wavelength of 1383 nm is so low that WDM transmissions are not obstructed thereby, and WDM transmissions can be realized in wavelength ranges having a wavelength of 1440 nm or shorter, whereby the optical fiber is applicable to a transmission line for WDM transmissions using the whole wavelength range of 1300 nm to 1625 nm as a signal wavelength band.

In the case where the transmission loss at a wavelength of 1550 nm is 0.3 dB/km or less whereas the chromatic dispersion in the wavelength range of 1530 nm to 1565 nm is 0.1 ps/nm/km or more but 16.5 ps/nm/km or less, the optical fiber enables WDM transmissions with a transmission quality on a par with or better than that of conventional WDM optical fibers in the wavelength band of 1530 nm to 1565 nm mainly used for WDM transmissions.

In the case where the transmission loss at a wavelength of 1383 nm after the hydrogen aging process is 0.4 dB/km or less, or does not exceed the transmission loss at a wavelength of 1310 nm exhibited before hydrogen aging, the optical fiber is suitable as a transmission line for WDM transmissions using wavelength ranges with a wavelength of 1440 nm or shorter as a signal wavelength band, since the transmission loss at a wavelength of 1383 nm increases only slightly even when influenced by hydrogen existing in the environment of use or hydrogen occurring from materials constituting optical cables.

The optical fiber according to the present invention comprises a first core extending along a predetermined axis and having a first refractive index; a second core surrounding the first core and having a second refractive index lower than the first refractive index; and a cladding region surrounding the second core and having a third refractive index lower than the second refractive index. The cladding region includes an optical cladding and a physical cladding. The transmission loss at a wavelength of 1383 nm is effectively reduced when the optical fiber satisfies at least one of conditions that the ratio (c/a) of the outer diameter 2c of the optical cladding to the outer diameter 2a of the first core is 4.8 or more, that the core rod is dehydrated at a high temperature of 1250° C. or more in the step of making the optical fiber preform, and that the outer peripheral part of the core rod is ground by a thickness of 5% or more of the diameter thereof in the step of making the optical fiber preform.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber having characteristics as follows:
   a cutoff wavelength of 1300 nm or less at a length of 22 m;
   a transmission loss of 0.4 dB/km or less at a wavelength of 1383 nm;
   a chromatic dispersion as follows: 0.1 ps/nm/km≦chromatic dispersion≦5.5 ps/nm/km at a wavelength of 1383 nm; and
   a dispersion slope having an absolute value of 0.1 ps/nm²/km or less in the wavelength range of 1300 nm to 1625 nm.

2. An optical fiber according to claim 1, further having the following characteristics:
   a transmission loss of 0.3 dB/km or less at a wavelength of 1550 nm; and
   a chromatic dispersion as follows: 0.1 ps/nm/km≦chromatic dispersion≦16.5 ps/nm/km in the wavelength range of 1530 nm to 1565 nm.

3. An optical fiber according to claim 1, wherein the transmission loss at a wavelength of 1383 nm after completing a hydrogen aging process in which hydrogen is let out for 14 days or more after aging for 4 days in an atmosphere at room temperature with a hydrogen pressure of 1 atm is 0.4 dB/km or less.

4. An optical fiber according to claim 1, wherein the transmission loss at a wavelength of 1383 nm after completing a hydrogen aging process in which hydrogen is let out for 14 days or more after aging for 4 days in an atmosphere at room temperature with a hydrogen pressure of 1 atm does not exceed the transmission loss at a wavelength of 1310 nm exhibited before said hydrogen aging process.

5. An optical fiber according to claim 1, wherein the transmission loss at a wavelength of 1383 nm after completing a hydrogen aging process in which hydrogen is let out for 14 days or more after aging for 10 days in an atmosphere at room temperature with a hydrogen pressure of 0.01 atm is 0.4 dB/km or less.

6. An optical fiber according to claim 1, wherein the transmission loss at a wavelength of 1383 nm after completing a hydrogen aging process in which hydrogen is let out for 14 days or more after aging for 10 days in an atmosphere at room temperature with a hydrogen pressure of 0.01 atm does not exceed the transmission loss at a wavelength of 1310 nm exhibited before said hydrogen aging process.

7. An optical fiber according to claim 1, wherein said optical fiber comprises:
a first core extending along a predetermined axis and having a first refractive index;
a second core, provided on the outer periphery of said first core, having a second refractive index lower than said first refractive index; and
a cladding region, provided on the outer periphery of said second core, having a third refractive index lower than said second refractive index;
wherein said cladding region includes an optical cladding and a physical cladding; and
wherein the ratio (c/a) of the outer diameter $2c$ of said optical cladding to the outer diameter $2a$ of said first core is 4.8 or more.

8. An optical fiber according to claim 1, wherein said optical fiber comprises:
a first core extending along a predetermined axis and having a first refractive index;
a second core, provided on the outer periphery of said first core, having a second refractive index lower than said first refractive index; and
a cladding region, provided on the outer periphery of said second core, having a third refractive index lower than said second refractive index;
wherein said cladding region includes an optical cladding and a physical cladding; and
wherein, in a step of making an optical fiber preform for yielding said optical fiber, a core rod including an area to become said first core, second core, and optical cladding in said optical fiber preform is dehydrated in an atmosphere having a temperature of 1250° C or more.

9. An optical fiber according to claim 1, wherein said optical fiber comprises:
a first core extending along a predetermined axis and having a first refractive index;
a second core, provided on the outer periphery of said first core, having a second refractive index lower than said first refractive index; and
a cladding region, provided on the outer periphery of said second core, having a third refractive index lower than said second refractive index;
wherein said cladding region includes an optical cladding and a physical cladding; and
wherein, in a step of making an optical fiber preform for yielding said optical fiber, an outer diameter part in a core rod including an area to become said first core, second core, and optical cladding of said optical fiber preform, an outer diameter part is ground by a thickness of 5% or more of the outer diameter thereof.

10. An optical fiber comprising:
a first core extending along a predetermined axis and having a first refractive index;
a second core, provided on the outer periphery of said first core, having a second refractive index lower than said first refractive index; and
a cladding region, provided on the outer periphery of said second core, having a third refractive index lower than said second refractive index;
wherein said optical fiber has characteristics as follows:
a cutoff wavelength of 1300 nm or less at a length of 22 m;
a transmission loss of 0.4 dB/km or less at a wavelength of 1383 nm;
a chromatic dispersion as follows: 0.1 ps/nm/km $\leq$ chromatic dispersion $\leq$ 5.5 ps/nm/km at a wavelength of 1383 nm; and
a dispersion slope having an absolute value of 0.1 ps/nm$^2$/km or less in the wavelength range of 1300 nm to 1625 nm.

11. An optical fiber according to claim 10, further having the following characteristics:
a transmission loss of 0.3 dB/km or less at a wavelength of 1550 nm; and
a chromatic dispersion as follows: 0.1 ps/nm/km $\leq$ chromatic dispersion $\leq$ 16.5 ps/nm/km in the wavelength range of 1530 nm to 1565 nm.

12. An optical fiber according to claim 10, wherein the transmission loss at a wavelength of 1383 nm after completing a hydrogen aging process in which hydrogen is let out for 14 days or more after aging for 4 days in an atmosphere at room temperature with a hydrogen pressure of 1 atm is 0.4 dB/km or less.

13. An optical fiber according to claim 10, wherein the transmission loss at a wavelength of 1383 nm after completing a hydrogen aging process in which hydrogen is let out for 14 days or more after aging for 4 days in an atmosphere at room temperature with a hydrogen pressure of 1 atm does not exceed the transmission loss at a wavelength of 1310 nm exhibited before said hydrogen aging process.

14. An optical fiber according to claim 10, wherein the transmission loss at a wavelength of 1383 nm after completing a hydrogen aging process in which hydrogen is let out for 14 days or more after aging for 10 days in an atmosphere at room temperature with a hydrogen pressure of 0.01 atm is 0.4 dB/km or less.

15. An optical fiber according to claim 10, wherein the transmission loss at a wavelength of 1383 nm after completing a hydrogen aging process in which hydrogen is let out for 14 days or more after aging for 10 days in an atmosphere at room temperature with a hydrogen pressure of 0.01 atm does not exceed the transmission loss at a wavelength of 1310 nm exhibited before said hydrogen aging process.

16. An optical fiber according to claim 10, wherein said cladding region includes an optical cladding and a physical cladding; and
wherein the ratio (c/a) of the outer diameter $2c$ of said optical cladding to the outer diameter $2a$ of said first core is 4.8 or more.

17. An optical fiber according to claim 10, wherein said optical fiber comprises:

a first core extending along a predetermined axis and having a first refractive index;

a second core, provided on the outer periphery of said first core, having a second refractive index lower than said first refractive index; and a cladding region, provided on the outer periphery of said second core, having a third refractive index lower than said second refractive index;

wherein said cladding region includes an optical cladding and a physical cladding; and wherein, in a step of making an optical fiber preform for yielding said optical fiber, a core rod including an area to become said first core, second core, and optical cladding in said optical fiber preform is dehydrated in an atmosphere having a temperature of 1250° C. or more.

18. An optical fiber according to claim 10, wherein said optical fiber comprises:

a first core extending along a predetermined axis and having a first refractive index;

a second core, provided on the outer periphery of said first core, having a second refractive index lower than said first refractive index; and a cladding region, provided on the outer periphery of said second core, having a third refractive index lower than said second refractive index;

wherein said cladding region includes an optical cladding and a physical cladding; and wherein, in a step of making an optical fiber preform for yielding said optical fiber, an outer diameter part in a core rod including an area to become said first core, second core, and optical cladding, an outer diameter part in said optical fiber reform is ground by a thickness of 5% or more of the outer diameter thereof.

* * * * *